3,529,002
PRODUCTION OF GLYCOL MONOESTERS OF
CARBOXYLIC ACIDS
Harry Distler, Ludwigshafen (Rhine), and Kurt Schneider, Limburgerhof, Pfalz, Germany, assignors to Badische Anilin- & Soda-Fabrik Aktiengesellschaft, Ludwigshafen (Rhine), Germany
No Drawing. Filed Sept. 19, 1966, Ser. No. 580,185
Claims priority, application Germany, Oct. 23, 1965, B 84,235
Int. Cl. C07c 67/00
U.S. Cl. 260—410.6
6 Claims

ABSTRACT OF THE DISCLOSURE

Process for the production of glycol monoesters of carboxylic acids wherein carboxylic acids are reacted with 1,2-epoxides at a temperature of from 25° to 200° C. in the presence of 0.1 to 20% by weight of a sulfoxide. Glycol monoesters of carboxylic acids are produced by the process in high yields and without contamination by polymers of 1,2-epoxides.

---

This invention relates to a process for the production of glycol monoesters of carboxylic acids.

It is known that glycol monoesters are formed by reacting glycols with carboxylic acids. It is also known that ethylene oxide will react with carboxylic acids in the presence of tertiary amines or alkali metal hydroxides to form glycol monoesters. These reactions however proceed irregularly. Thus the reaction of acetic acid with ethylene oxide in the presence of basic catalysts results in a mixture of glycol monoacetate, glycol diacetate and unreacted acetic acid. The production of pure glycol monoesters from such mixturets by distillation offers considerable difficulty. Moreover the basic catalysts cause polymerization of the ethylene oxide under the reaction conditions with the formation of polyglycols. If ethylene oxide be reacted with acetic acid in the presence of an acid catalyst, glycol diacetate is formed preferentially.

It is an object of this invention to provide a process according to which glycol monoesters of carboxylic acids are prepared in a unitary reaction in high yields. It is another object of the invention to provide a process according to which glycol monoesters of carboxylic acids are prepared without contamination by polymers of 1,2-expoxides.

In accordance with this invention the said and other objects and advantages are achieved by reacting a carboxylic acid with a 1,2-epoxide at elevated temperature in the presence of a sulfoxide, and in the presence or absence of solvents.

It is preferred to use for the process aliphatic, cycloaliphatic, araliphatic or aromatic monocarboxylic or polycarboxylic acids having up to twenty carbon atoms, particularly monocarboxylic, dicarboxylic and tricarboxylic acids having upon to twelve carbon atoms. The carboxylic acids may have (apart from the carboxyl groups) saturated hydrocarbon structure, if desired with aromatic nuclei. They may however also be unsaturated, for example may contain one or two olefinic double bonds and/or may have one to three substituents which may be inert under the reaction conditions and which may be connected via bridging groups, examples of these substituents being alkyl radicals having one to four carbon atoms, carboxylic ester groups with alcohols having one to twelve carbon atoms, and also halogen atoms, such as chlorine atoms or bromine atoms, or hydroxyl groups. Examples of suitable carboxylic acids are formic acid, acetic acid, propionic acid, butyric acid, isobutyric acid, oenanthic acid, stearic acid, palmitic acid, acrylic acid, methacrylic acid, linoleic acid, linolenic acid, succinic acid, adipic acid, dodecanoic acid-(1,12), itaconic acid, monomethyl adipate, cyclobutane dicarboxylic acid-(1,2), cyclohexane carboxylic acid, phenylacetic acid, benzoic acid, salicylic acid, p-methoxybenzoic acid, p-chlorobenzoic acid, phthalic acid, monoethyl phthalate, pyromellitic acid, naphthoic acid or terephthalic acid.

It is preferred to use aliphatic, cycloaliphatic or araliphatic 1,2-epoxides having two to twelve carbon atoms, particularly two to eight carbon atoms. Epoxides having two to four carbon atoms have particular industrial importance. The 1,2-epoxides used preferably have one epoxy group in the molecule and may contain one or two double bonds. Examples of suitable 1,2-epoxides are: ethylene oxide, propylene oxide, butylene oxide, butadiene monoxide, cyclohexene oxide, cyclododecatrine (1,5,9) monoxide or styrene oxide. The carboxylic acids and 1,2-epoxides are in general used in a molar ratio of from 1:1 to 1:10, particularly from 1:1 to 1:1.5.

Preferred sulfoxides are compounds having the formula:

$$R^1\text{---SO---}R^2$$

in which $R^1$ and $R^2$ denote aliphatic, cycloaliphatic, araliphatic or aromatic radicals having one to twelve carbon atoms. $R^1$ and $R^2$ need not be identical. They may together be members of a heterocyclic ring including the SO group. In particularly preferred sulfoxides $R^1$ and $R^2$ denote lower aliphatic radicals having one to four carbon atoms or common members of a ring having five or six members. These radicals or members may be saturated or may have single or double olefinic unsaturation; they may have hydrocarbon structure or may bear one or two substituents which are inert under the reaction conditions, such as carboxyl groups, hydroxyl groups and alkoxy groups having one to four carbon atoms. Compounds which may be used according to this invention are for example: dimethyl sulfoxide, diethyl sulfoxide, diisopropyl sulfoxide, methyl ethyl sulfoxide, methyl dodecyl sulfoxide, tetramethylene sulfoxide, pentamethylene sulfoxide, dicylclohexyl sulfoxide, sulfinyldiacetic acid, bis-(2-hydroxyethyl)sulfoxide, methyl phenyl sulfoxide, benzyl methyl sulfoxide, diphenyl sulfoxide or methyl vinyl sulfoxide. It is also possible for the sulfoxide group to be present more than once in the molecule. The sulfoxides may be used as such; it is also possible however to produce them in situ from thioethers and oxidizing agents.

It is advantageous to use the sulfoxide in an amount of from 0.1 to 20% by weight on the starting material, particularly in an amount of 1 to 10% by weight.

The reaction is carried out at elevated temperature, in general at from 25° to 200° C., preferably from 60° to 150° C. Atmospheric pressure is preferred. It is possible however, when using low boiling point starting materials in the liquid phase, to use superatmospheric pressure, for example up to 50 atmospheres.

It is not necessary to use solvents, but the process may also be carried out in the presence of water or of organic solvents which are inert under the reaction conditions and which are liquid at the reaction temperatures, such as hydrocarbons, for example hexane, cyclohexane, toluene or benzene, and also ketones, such as acetone or methyl ethyl ketone. In particular cases, for example when using sparingly soluble carboxylic acids, such as terephthalic acid, it is advantageous to use the sulfoxide in excess as catalyst and solvent.

The process according to the invention is carried out for example by placing a carboxylic acid and a sulfoxide in the said concentration in a stirred vessel, in the presence or absence of an inert solvent, and metering in 1,2-epoxide at the stated temperature in the ratio described. If the 1,2-epoxide used is gaseous, it may be passed into the solution or metered in as a liquid under superatmospheric pressure. The reaction is in general over after one to three hours. The glycol monocarboxylic ester formed is purified by fractional distillation, if necessary after the solvent has been distilled off. Since the catalyst is not used up during the reaction, it may be used again after the glycol monoester has been separated from it.

The invention is illustrated by the following examples, in which parts are by weight.

EXAMPLE 1

144 parts of acrylic acid (stabilized with 0.1% by weight of nitrosophenol) and 4 parts of dimethyl sulfoxide are placed in a stirred flask. The mixture is heated to 60° to 65° C. and 100 parts of ethylene oxide is passed in in the course of three hours, intimate mixing being ensured by stirring. The reaction mixture is then separated by distillation. 218 parts of glycol monoacrylate having a boiling point of 58° to 60° C. at 0.5 mm. Hg is obtained (94% of the theory). Glycol diacrylate cannot be detected in the distilled glycol monoacrylate by gas-chromatographic analysis.

EXAMPLE 2

144 parts of acrylic acid (stabilized with 0.1% by weight of nitrosophenol) and 3 parts of sulfinyldiacetic acid are placed in a stirred flask. The mixture is heated to 60° to 65° C. and 100 parts of ethylene oxide is passed in in the course of three hours, intimate mixing being ensured by stirring. The reaction mixture is then separated by distillation. 214 parts (92% of the theory) of glycol monoacrylate is obtained having a boiling point of 58° to 60° C. at 0.5 mm. Hg.

EXAMPLE 3

150 parts of dimethyl sulfoxide is placed in a stirred flask and 332 parts of terephthalic acid is introduced at 70° to 80° C. in portions and at the same time 194 parts of ethylene oxide in the gas phase is introduced under the surface of the reaction mixture with very good stirring so that the ethylene oxide supplied is completely used up. The end of the reaction can be recognized by the fact that the clear reaction mixture ceases to absorb ethylene oxide. Dimethyl sulfoxide is distilled off in vacuo at a bottoms temperature of 80° C. and the residue is diluted with 390 parts of acetonitrile. Crystals separate out after some time and these are isolated by filtration. A second crop of crystals is obtained by concentrating the mother liquor. 455 parts (89% of the theory) of the monoglycol ester of terephthalic acid is obtained which has a melting point of 107° to 108° C.

The following carboxylic acids may be reacted with 1,2-epoxides in the presence of sulfoxides in the manner described in Example 1:

| Carboxylic acid | 1,2-epoxide | Sulfoxide |
|---|---|---|
| Stearic acid | Propylene oxide | Pentamethylenesulfoxide. |
| p-Methoxybenzoic acid | Epichlorohydrin | Diphenyl sulfoxide. |
| Phenylacetic acid | Cyclohexene oxide | Vinylmethyl sulfoxide. |
| Monomethyl adipate | Ethylene oxide | Benzylmethyl sulfoxide. |
| m-Chlorobenzoic acid | do | Bis-(2-hydroxyethyl) sulfoxide. |
| Pyromellitic acid | do | Dicyclohexyl sulfoxide. |

| Product: | Yield, percent |
|---|---|
| 2-hydroxypropyl stearate | 92 |
| 2-hydroxy-3-chloropropyl p-methoxybenzoate | 89 |
| 2-hydroxycyclohexyl phenylacetate | 91 |
| Glycolmethyl adipate | 94 |
| Glycol m-chlorobenzoate | 88 |
| Glycol pyromellitate | 85 |

We claim:
1. A process for the production of monoesters of carboxylic acids which comprises: reacting a carboxylic acid having up to twenty carbon atoms with a 1,2-epoxide having two to twelve carbon atoms at a temperature of from 25° to 200° C. in the presence of 0.1 to 20% by weight based on the weight of the starting materials of a sulfoxide having the formula

$$R^1\text{---}SO\text{---}R^2$$

in which $R^1$ and $R^2$ denote hydrocarbon radicals having up to twelve carbon atoms or hydrocarbon radicals having up to twelve carbon atoms and bearing one or two inert substituents, and $R^1$ and $R^2$ together with the SO group form a heterocyclic ring of 5 to 6 members.

2. A process as in claim 1 wherein said sulfoxide is selected from the group consisting of dimethyl sulfoxide, diethyl sulfoxides, diisopropyl sulfoxide, methyl ethyl sulfoxide, methyl dodecyl sulfoxide, tetramethylene sulfoxide, pentamethylene sulfoxide, dicyclohexyl sulfoxide, sulfinyldiacetic acid, bis - (2 - hydroxyethyl) sulfoxide, methyl phenyl sulfoxide, benzyl methyl sulfoxide, diphenyl sulfoxide and methyl vinyl sulfoxide.

3. A process as claimed in claim 1 wherein a monocarboxylic, dicarboxylic or tricarboxylic acid having up to twelve carbon atoms is used.

4. A process as claimed in claim 1 wherein a 1,2-epoxide having two to four carbon atoms is used.

5. A process as claimed in claim 1 wherein a temperature of from 60° to 150° C. is used.

6. A process as claimed in claim 1 wherein the amount of sulfoxide used is 1 to 10% by weight on the starting materials.

References Cited

UNITED STATES PATENTS 3,340,295   9/1967   Wheeler et al. _____ 260—486
3,023,183   2/1962   Nelson _____ 260—410.6 X LORRAINE A. WEINBERGER, Primary Examiner R. S. WEISSBERG, Assistant Examiner U.S. Cl. X.R.

260—468, 473, 474, 475, 476, 485, 486, 496